Patented Jan. 27, 1953

2,626,870

UNITED STATES PATENT OFFICE 2,626,870

WAX AND SILICONE OIL AUTO POLISH

Henry H. Cooke and Dominick Russo, Elizabeth, N. J., assignors to Standard Oil Development Company, a corporation of Delaware No Drawing. Application December 5, 1949, Serial No. 131,244

2 Claims. (Cl. 106—10)

This invention relates to improved emulsion polishing compositions of the oil-in-water type. More particularly, this invention relates to improved automobile wax emulsion polishing compositions of the oil-in-water type containing small amounts of silicone oils in the dispersed phase.

Polishing compositions and their manufacture constitute an old and well-known art. Such compositions of a type adaptable for use on smooth, painted or enameled surfaces, are quite familiar to those experienced in the art. One of the more popular of these polishes is the wax composition of the oil-in-water emulsion type which has found wide usage for polishing automobiles.

It has become apparent in practice, however, that these wax emulsions suffer from certain distinct disadvantages. One of these disadvantages resides in the formation of wax streaks on the polished surface. This formation of streaks occurs most readily in dry atmospheres. Another disadvantage resides in the excessive amount of rubbing needed in using these wax polishes in order to secure the desired luster.

It has now been found that incorporation of small amounts of silicone oils in the indicated wax oil-in-water type emulsion compositions results in polishes which, when applied to a painted or lacquered metal surface, impart a high degree of luster and a pleasing appearance to the surface, and require comparatively little effort in the application and polishing. These polishes leave no waxy streaks on the surface to which they are applied, even under extremely dry conditions. When the products are applied to the automobile surfaces and allowed to dry, the film is very easy to remove and a high deep luster is obtained without the formation of wax streaks. The silicone oils plasticize the wax and prevent it from drying to a hard film. In addition, the silicone and wax together act as a binder for the abrasive particles in the dried film on the automobile surface, and help to prevent excessive dust formation in the polishing operation. Tests show that this luster stands up exceptionally well under outdoor conditions.

When particles of dust and dirt become attached to the automobile surface, they can be easily removed with a damp cloth and the original luster is obtained again. This is due to the protecting silicone and wax film which remains on the surface. This film is also resistant to rain spotting, and subsequent dirt formations can be readily wiped off with a dusting cloth. All these results are obtained because of the combined cooperative effect of the wax and silicone oils.

The more important ingredients of the water emulsion polishes of this invention are: silicone oils, wax, an abrasive, an emulsifying agent of the bodying type, a water soluble wetting agent, and an organic solvent for the wax.

The silicone oils employed may be represented by the following chemical formula in which siloxane units are joined together to form chains of varying length.

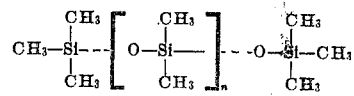

The methyl groups may be substituted or replaced by other organic or inorganic groups or by single atoms. These silicone fluids are complex, highly molecular weight polymers whose viscosity varies roughly directly with molecular weight. The characteristics of the silicone oils which are useful in the compositions of this invention are illustrated below in Tables I, II and III.

TABLE I

| Viscosity Grade in cstks. @ 25° C. | Flash Point, Minimum °F. | Specific Gravity @ 25°C./25°C. | Pounds Per Gallon @ 25°C. | Refractive Index @ 25°C. | Expansion Coefficient C×10³ per °C. | | Viscosity in cstks. at | | |
|---|---|---|---|---|---|---|---|---|---|
| | | | | | −25 to 0° C. | 25 to 100° C. | −40° F. | 100° F. | 210° F. |
| 100 | 600 | 0.968 | 8.08 | 1.4030 | 0.926 | 0.969 | 650 | 82 | 32 |
| 200 | 615 | 0.971 | 8.10 | 1.4031 | 0.921 | 0.968 | 1,300 | 160 | 65 |
| 350 | 625 | 0.972 | 8.11 | 1.4032 | 0.917 | 0.966 | 1,950 | 260 | 135 |
| 500 | 625 | 0.972 | 8.11 | 1.4033 | 0.909 | 0.965 | 3,300 | 370 | 190 |

TABLE II

| Viscosity in cstks. @ 100° F. | Flash Point, °C. | Sp. Gr. @ 20° C. | SP. HT., 80° F. | Refr. Index @ 25° C. | Expansion Coefficient per Degree C. (25-150° C.) | Viscosity Temp. Coefficient |
|---|---|---|---|---|---|---|
| 4 | 70 | 0.9175 | 0.390 | 1.3970 | $10.63 \times 10.4$ | 0.520 |
| 40 | 314 | 0.9708 | 0.374 | 1.4031 | $9.49 \times 10.4$ | 0.570 |
| 100 | 320 | 0.9653 | 0.370 | 1.4030 | $9.68 \times 10.4$ | 0.590 |
| 1,000 | 323 | 0.9693 | 0.352 | 1.4036 | $9.20 \times 10.4$ | 0.599 |

TABLE III

| Viscosity in cstks. @ 100° F. | Flash Point, °C. | Sp. Gr. @ 25° C. | Refr. Index @ 20° C. |
|---|---|---|---|
| 20-40 | 120 | 0.962 | 1.397-1.407 |

Silicone oils having an upper viscosity limit of 500 cstks. at 25° C. are particularly effective. The preferred range of the silicone oil in the aqueous emulsion compositions of this invention is about from 0.001 to 5% by weight. The amount of silicone oil employed varies roughly in an inverse manner to the viscosity of the oils. Mixtures of silicone oils can be employed. Solid and semi-solid silicone polymers may also be used. It should be noted particularly that very small quantities of these silicone oils give the desired effect. These silicone oils may also be incorporated in paste type polishes.

The waxes employed in the compositions of this invention are synthetic waxes, natural waxes, or mixtures. It is to be understood that the term "waxes" as used herein refers to any combination of the before-mentioned types. The range of the waxes in the polishing compositions is about from 0.2 to 15% and preferably 1 to 5% by weight. Some of the particular waxes that can be used are carnauba wax, beeswax, candelilla, ouricury, ceresin, paraffin, hydrogenated castor oil and synthetic ester waxes.

Mild abrasives which do not scratch the surface are also used in order to obtain improved cleaning characteristics. These abrasives are utilized in a range of about from 5 to 15% by weight. Some particular abrasives that can be used are diatomaceous earth, amorphous silica, tripoli and chalk.

An emulsifying agent of the bodying type is employed in order to obtain stable emulsions of the wax in water. These emulsifying agents are used in a range of about from 0.2 to 4% by weight. It is to be understood that the term "emulsifying agents of the bodying type" connotes the following type substances: gum tragacanth, gum arabic, bentonite, locust bean gum, starch, albumen, karaya gum, Irish moss, water-colloidable methyl cellulose, and the like.

Organic solvents are employed in order to dissolve the wax before dispersion of the latter in the water. These solvents are used in a range of about from 3 to 25% by weight. Typical solvents are illustrated by turpentine, kerosene, Stoddard solvent, naphtha and spindle oil.

Water soluble wetting agents are employed in an amount of less than 1%. These wetting agents contribute to the ready spreading of the polish on the polished surface. Among the water soluble wetting agents that can be used are the sulfates of long chain alcohols such as dodecanol up to octadecanol, sulfonated amide and ester derivatives, sulfonated aromatic and mixed alkylaryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used.

The products of this invention consist of two phases, the aqueous or continuous phase and the oily or dispersed phase. To form the oily phase, the wax is gently heated to its melting point and the solvent is added while the mixture is kept warm above the melting point of the wax. An emulsifying agent of the bodying type is added. The silicone oil is then also added. The mixture is stirred until smooth and free from lumps. The aqueous phase is formed by adding the water soluble ingredients such as the wetting agent to hot water, e. g., 150° F. The oil phase is then added slowly to the aqueous phase with continued stirring to effect emulsification. The abrasive is then added with stirring. Coloring matter and odorants are next dispersed in the mixture.

Typical formulations are illustrated in the following examples.

*Example No. 1*

| | Per cent by weight |
|---|---|
| Petroleum sulfonate | 0.33 |
| Water | 74.17 |
| Silicone oil | 3.00 |
| Bentonite | 1.50 |
| Diatomaceous earth | 9.00 |
| Carnauba wax | 2.00 |
| Kerosene | 10.00 |
| | 100.00 |

*Example No. 2*

| | Per cent by weight |
|---|---|
| Water, tap | 76.17 |
| Petroleum sulfonate | 0.33 |
| Silicone oil emulsion | 5.00 |
| Bentonite | 1.50 |
| Diatomaceous earth | 10.00 |
| Carnauba wax | 2.00 |
| Kerosene | 5.00 |
| | 100.00 |

*Example No. 3*

| | Per cent by weight |
|---|---|
| Glycerine | 2.00 |
| Diatomaceous earth | 10.00 |
| Bentonite | 1.50 |
| Spindle oil | 6.00 |
| Silicone oil | 0.10 |
| Petroleum sulfonate | 0.33 |
| Water | 77.07 |
| Paraffin wax | 1.50 |
| Candelilla wax | 1.50 |
| | 100.00 |

The polishing compositions described above are generally useful for imparting a high luster to all kinds of smooth, painted metal surfaces. They are principally useful for polishing automobile bodies finished with various types of coating compositions, including pigmented nitrocellulose lacquers, enamels containing either natural or synthetic resin vehicles, or combinations thereof, asphaltic varnishes and pigmented derivatives thereof, etc. Its use is not confined to automobiles, however; it may be used wherever it is desired to impart a high luster to paint applied over smooth metal surfaces. Thus, it finds wide application in the field of furniture and building partitions, particularly those made of metal; for burial caskets, painted household heating stoves, refrigerators, and for many objects having similar surfaces. The composition is applied to the surface to be polished after most of the dirt and grit has been removed. After it has been allowed to dry, it is wiped off and polished with a clean dry cloth.

It is to be understood that the invention is not limited to the specific examples which have been offered merely as illustrations, and that modifications may be made without departing from the spirit of the invention.

What is claimed is:

1. An emulsion polishing composition of the oil in water type consisting essentially of a straight chain polydimethyl siloxane having a viscosity of no more than 500 centistokes at 25° C. in an amount of from about 0.001 to 5% by weight, a wax in an amount of about from 1 to 5% by weight, an abrasive in an amount of about 5 to 15% by weight, an emulsifying agent of the bodying type in an amount of about from 0.2 to 4% by weight, a hydrocarbon solvent for the wax in an amount of about from 3 to 25% by weight, a water soluble wetting agent selected from the group consisting of synthetic non-ionic and anionic wetting agents in an amount of less than 1% by weight and the balance water.

2. A polishing composition having approximately the following weight percent composition:

| | Percent by weight |
|---|---|
| Glycerine | 2.00 |
| Diatomaceous earth | 10.00 |
| Bentonite | 1.50 |
| Spindle oil | 6.00 |
| Silicone oil | 0.10 |
| Petroleum sulfonate | 0.33 |
| Water | 77.07 |
| Paraffin wax | 1.50 |
| Candelilla wax | 1.50 |
| | 100.00 |

HENRY H. COOKE.
DOMINICK RUSSO.

REFERENCES CITED

The following references are of record in the file of this patent:

UNITED STATES PATENTS

| Number | Name | Date |
|---|---|---|
| 2,392,805 | Biefeld | Jan. 15, 1946 |
| 2,406,671 | Diamond | Aug. 27, 1946 |
| 2,482,888 | Walsh | Sept. 27, 1949 |
| 2,523,281 | Currie | Sept. 26, 1950 |

OTHER REFERENCES

"Chemistry and Technology of Waxes" Warth; Reinhold Pub. Co., N. Y., 1947, pp. 454 and 455.